United States Patent [19]

Wheelock et al.

[11] 3,974,256
[45] Aug. 10, 1976

[54] SULFIDE REMOVAL PROCESS
[75] Inventors: Kenneth S. Wheelock; Clyde L. Aldridge, both of Baton Rouge, La.
[73] Assignee: Exxon Research and Engineering Company, Linden, N.J.
[22] Filed: May 7, 1974
[21] Appl. No.: 467,716

[52] U.S. Cl. ............................ 423/230; 423/244; 423/563; 423/564; 55/73; 55/74
[51] Int. Cl.² .......................................... B01D 53/34
[58] Field of Search ........... 423/220, 230, 564, 244, 423/563; 252/462; 55/73, 74

[56] References Cited
UNITED STATES PATENTS
1,900,751   3/1933   Baehr et al. ....................... 423/230

*Primary Examiner*—Earl C. Thomas
*Attorney, Agent, or Firm*—Jay Simon

[57] ABSTRACT

Hydrogen sulfide and its precursors can be selectively sorbed from gas streams containing same by contacting the gas stream at elevated temperatures with a regenerable sorbent comprising a supported or unsupported lanthanum or rare earth metal component. Subsequent to sorption, the sorbent may be desorbed and regenerated by treatment with steam (desorption) and an oxidizing gas (regeneration). The sorbent capacity may be increased by the use of alkali or alkaline earth metal components as promoters.

35 Claims, 2 Drawing Figures

SULFIDE REMOVAL PROCESS

FIELD OF THE INVENTION

This invention relates to the sorbing of hydrogen sulfide and precursors thereof contained in gaseous reducing streams by contacting the gaseous stream with a supported or unsupported lanthanum or rare earth metal-containing material preferably lanthanum. More particularly, this invention relates to a process for essentially quantitative removal of hydrogen sulfide and precursors thereof, from gaseous streams by contacting the gaseous stream, at elevated temperatures, with a porous regenerable lanthanum or rare earth metal containing sorbent. The sorbent can be regenerated by contact with steam followed by contact with an oxidizing gas. The steam contacting of the hydrogen sulfide loaded sorbent leads to the desorption of hydrogen sulfide as a more concentrated gas than in the gaseous feed stream. Often concentrated hydrogen sulfide streams can be used advantageously such as in conventional sulfur processes, e.g. Claus process. In preferred embodiments of this invention, an alkali metal or alkaline earth metal component, such as potassium, may be added to the sorbent to increase the sorbent capacity for hydrogen sulfide and, using two parallel contacting zones, a cyclic sorption-desorption process is presented.

DESCRIPTION OF THE PRIOR ART

The removal of hydrogen sulfide from gaseous streams is of primary importance to refiners today. Thus, not only is hydrogen sulfide a catalyst poison for some downstream processing, e.g., methanation of carbon monoxide-containing streams, but environmental considerations dictate the removal of sulfur-containing components from fuel gases. The several commercially available processes for hydrogen sulfide removal can be roughly divided into two categories, that is, low temperature processes, e.g., 200° – 300°F. involving scrubbing the gas streams with liquid solutions such as mixtures of ethanolamines or mixtures comprising anthraquinone disulfonic acids and high temperature processes, e.g., about 1000°F., involving contacting the gas stream with a bulk sorbent such as zinc oxide or ferric oxide.

The low temperature processes typically incorporate some regenerable compound which also acts as an oxidant, oxidizing the hydrogen sulfide to sulfur, in conjunction with a reductant, which regenerates the oxidant. The use of such processes, however, when the gaseous stream is to be combusted is disadvantageous since the gas is normally produced at high temperatures and must be cooled before treatment for hydrogen sulfide removal. High temperature processes, on the other hand, lead to the formation of highly stable sulfides. Materials used in these processes can be roasted to release the sulfur as sulfur dioxide. However, roasting yields a dilute stream of sulfur dioxide (~14 percent) which is costly to process if air is used as the oxygen source. More concentrated sulfur dioxide streams can be obtained by using oxygen to roast the sorbent, also a costly process. Steam may also be used but the amount of steam required is excessive. Thus, such sorbents are oftentimes discarded rather than being regenerated. Such a process is illustrated by U.S. Pat. No. 3,579,293 which discloses the use of supported ferric oxide and fly ash as the sorbent to overcome the distintegration of solid sorbents during repeated periods of burning.

SUMMARY OF THE INVENTION

It has now been found that gaseous reducing streams containing hydrogen sulfide or precursors thereof, e.g., carbonyl sulfide, can be treated with a regenerable sorbent comprising a lanthanum or a rare earth metal-containing component, preferably lanthanum, at elevated temperatures, e.g., above about 300°F., to selectively sorb the hydrogen sulfide essentially quantitatively, that is, 99+% of the hydrogen sulfide in the gaseous feed stream can be sorbed prior to the breakthrough point. The sorbent can be either unsupported or supported, for example, lanthanum oxide on alumina, and can be regenerated by a two-stage process involving desorption, preferably with steam to remove the hydrogen sulfide as hydrogen sulfide followed by treatment with an oxidizing gas. In this way, the regenerable sorbent may be used many times over for the removal of hydrogen sulfide or its precursors from gaseous streams.

Figure 1:
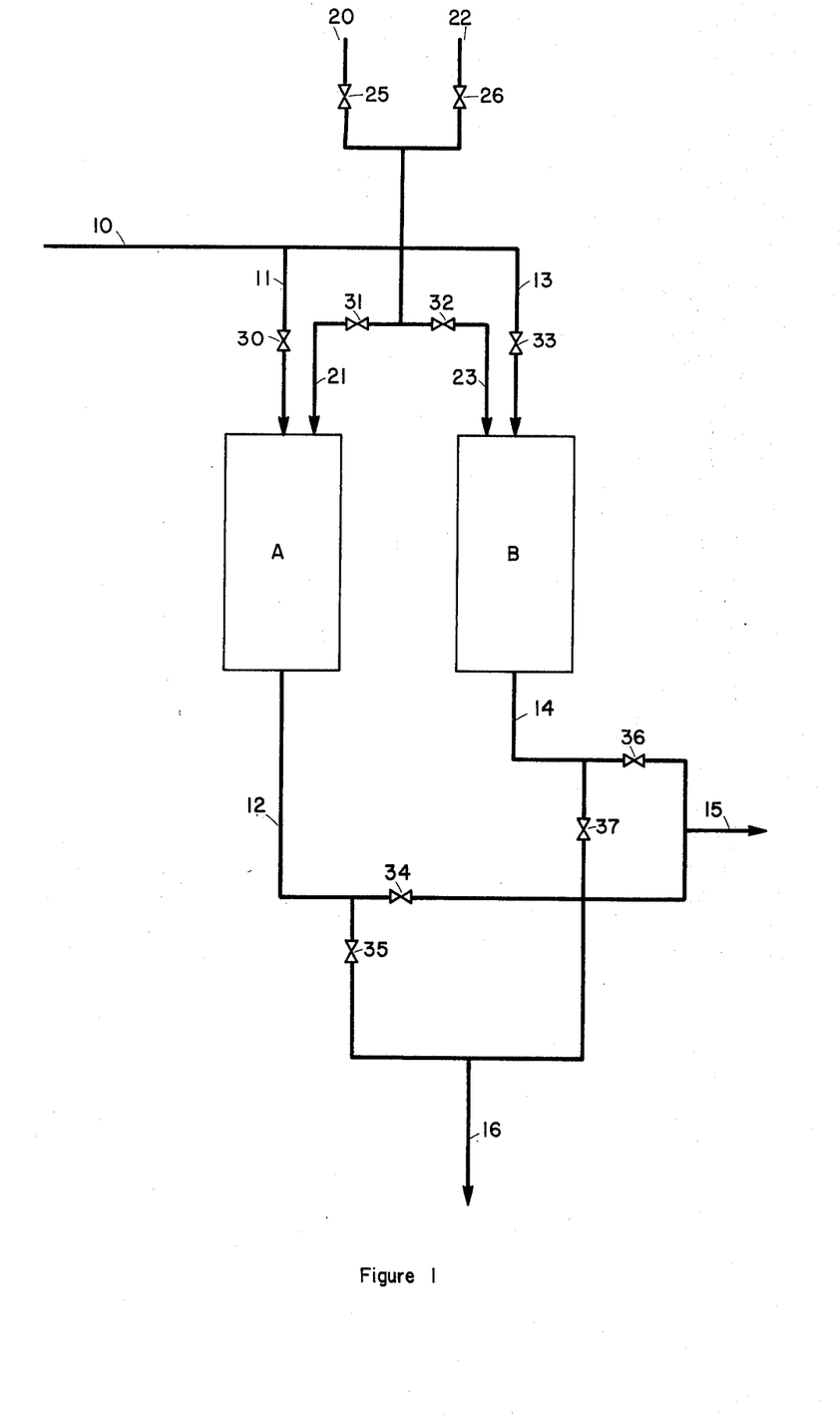
FIG. 1 depicts a balanced sorption-desorption operation carried out in parallel reactor trains and where the time period for sorption is substantially equal to the time period for desorption/activation.

Since the sorbent is regenerable, a cyclic process, as shown in FIG. 1, can be advantageously employed.

In a preferred embodiment, an alkali or alkaline earth metal component, e.g., lithium, sodium, potassium, rubidium, cesium, calcium, magnesium and the like, preferably sodium or potassium and, most preferably, potassium can be added to the sorbent to increase to sorption capacity of the sorbent for hydrogen sulfide.

In another embodiment of this invention, supported sorbents, act as a catalyst for the conversion of carbonyl sulfide (a hydrogen sulfide precursor) to hydrogen sulfide by what is believed to be the following mechanism:

$$COS + H_2O \rightarrow H_2CO_2S \qquad (1)$$

however, organic thio-acids are known to be unstable resulting in:

$$H_2CO_2S \rightarrow CO_2 + H_2S \qquad (2)$$

the equilibrium favoring the stronger acid. Consequently, the resulting hydrogen sulfide is selectively sorbed and the gaseous feed stream is depleted of both hydrogen sulfide and carbonyl sulfide.

The invention can be broadly characterized as a process for reducing the sulfide concentration of gaseous streams where the sulfide generally may be hydrogen sulfide, carbonyl sulfide or mixtures thereof.

The gaseous reducing stream is treated by contacting it with a supported or unsupported, but preferably supported, sorbent comprising a metal component selected from the group consisting of lanthanum, rare earths or mixtures thereof. Any of the metals lanthanum, cerium, praseodymium, neodymium, promethium, samarium, europium, gadolinium, terbium, dysprosium, holmium, erbium, thulium, ytterbium, lutetium, that is, metals having an atomic number of from 57 through 71 inclusive, or mixtures thereof can be satisfactorily employed. Preferably, however, lanthanum or didymium are employed. Didymium was classically used to specify a mixture of neodymium and praseodymium but has now been commonly known to refer to a cerium-free mixture of rare earths and comprising metals mainly of the first half of the rare earth series and primarily lanthanum, praseodymium and neodymium. Most preferably, the sorbent is comprised of a lanthanum component, lanthanum being the most abundant and, therefore, the most economically attractive of the metal components that can act as the sorbent.

Sorbent preparation, particularly in regard to supported sorbents, generally follows standard techniques for depositing metal components on supports. Thus, for example, a solution of lanthanum nitrate is contacted with a solid refractory oxide, e.g., alumina, to impregnate the metal component onto the support. The desired metal compound may be a water soluble salt, e.g., nitrates, acetates, carbonates, etc. or hydrocarbon soluble. It is only important that the salt decompose to the oxide form during subsequent calcination. Impregnation is preferably effected under slightly acidic conditions since basic conditions may cause the metal component, e.g., $La(OH)_3$ to precipitate from solution, thereby increasing the difficulty of impregnating the support. After impregnation the metal-containing support may be dried by heating to drive off any moisture, for example, to about 212°F. to 350°F. for a short period of time, e.g., 60 to 180 minutes and is then calcined in air or other oxidizing atmosphere. Calcination can generally be effected at the temperatures above about 900°F., preferably 900° to 1100°F. for at least about 8 hours, preferably about 12 to 24 hours. The sorbent should be calcined at the temperature of expected use, that is, if the sorbent process is designed to operate at 1000°F., the sorbent should be calcined at 1000°F.; if the sorbent process is designed to operate at 1200°F., it should be calcined at 1200°F., etc.

As mentioned, the support material can be any porous carrier such as aluminosilicates or refractory oxides, e.g., alumina, zirconia, magnesia, silica, titania, vanadia, but is preferably alumina. k In the supported condition the metal component can be present in any suitable amount, considerations being the gaseous feed stream to be contacted and economic considerations regarding length of the sorbing and for desorbing cycles. Normally, however, the metal component can be present in amounts ranging from about 1 to 50% by weight of the support, preferably about 5 to 35 wt. % and more preferably about 10 to 30 wt. %, calculated on the basis of the oxide.

In a preferred embodiment, the lanthanum or rare earth metal component can be supplemented by the addition of a promoter to increase the sorbent hydrogen sulfide capacity at lined out (that is, steady state) conditions. The promoter can be any of the alkali or alkaline earth metals whose oxides are basic anhydrides, e.g., sodium oxide, potassium oxide, calcium oxide, magnesium oxide, etc., or salts of these metals that decompose on heating to the basic anhydride, such as potassium nitrate which decomposes to potassium oxide. Preferably, however, potassium is employed as the promoter. Promoter effects are generally encountered at promoter concentrations of at least about 0.1 atoms per atom of metal oxide component, the promoter and the metal being measured on the basis of the metals. Preferably, the ratio is at least about 0.1 to about 10 atoms per atom, more preferably at least about 0.5 to 3 atoms per atom and still more preferably from about 1 to about 2 atoms per atom, e.g., 1.3:1.

The promoter is generally incorporated onto the supported sorbent after impregnation of the lanthanum or rare earth metal component and calcination. Thus, solutions of the promoter, e.g., KOH, are basic in nature and could cause precipitation of the sorbent metal. The promoter solution is used to impregnate the calcined sorbent and then the promoted sorbent is dried and again calcined as before. However, when promoter salts are employed as the nitrates, impregnation of the support by the promoter salt and the rare earth may be accomplished prior to drying and calcination, e.g., co-impregnation or serial impregnation.

The sorbent may also be employed in an unsupported manner by using the basic properties of the promoter metal to precipitate a rare earth gel which is known to the art. The gel can then be dried and calcined (as before mentioned) and ready for use.

In commercial use, the sorbent is employed preferably in a fixed bed which allows cyclic contact by the sour, hydrogen sulfide containing gas and steam during the desorption step. It should be noted that stainless steel reactors in wet hydrogen sulfide service at elevated temperatures tend to undergo stress corrosion. In addition, they also tend to take up experimentally significant quantities of hydrogen sulfide. Deposition of ferroaluminum (alonizing) alloy on the interior surface of the reactor renders the reactor surfaces passive to both hydrogen sulfide and sulfur dioxide.

The feed streams to be treated by the process disclosed herein can be essentially characterized as reducing gas streams. Since the gas streams contain hydrogen sulfide and perhaps carbonyl sulfide, they may also be characterized as sour gas streams. The process disclosed herein is particularly applicable to gas streams produced by the gasification of fluid coke as disclosed in U.S. Pat. No. 3,661,543, the disclosure of which is hereby incorporated by reference. The gas streams produced in the gasification of fluid coke when gasification is effected by either air or oxygen have typical compositions as shown below:

| Air Gasification, Mol % | | Oxygen Gasification, Mol % |
|---|---|---|
| $H_2$ | 6.5 | 24.2 |
| $H_2O$ | 2.9 | 20.0 |
| CO | 19.9 | 34.2 |
| $CO_2$ | 7.9 | 19.8 |
| $N_2$ | 61.9 | 0.1 |
| $H_2S$ | 0.9 | 1.7 |

Of course, actual gas compositions can vary somewhat widely and can also include minor amounts of carbonyl sulfide, e.g, 0.01 to 2.00 mol %, as well as some light hydrocarbons, e.g., methane; however, the gas stream is essentially of a reducing nature and contains sulfide components.

The process is also applicable to gases produced or manufactured by the gasification of carbonaceous materials containing sulfur compounds, such as coal, coke, whole or topped crudes, residua, distillates, e.g., naphtha or gas oil, etc. A general treatment of gas producing processes may be found in the Kirk-Othmer Encyclopedia of Chemical Technology, 2nd Edition, Volume 10 (1966) published by John Wiley & Sons, Inc. at pages 353-442. Natural gases containing hydrogen sulfide or its precursors may also be treated in accordance with this invention, see Encyclopedia of Chemical Technology, supra, pages 443-460.

The sorbent process is also applicable to hydrogen containing recycle gas streams utilized in the hydrotreating of petroleum distillates, e.g., naphtha, atmospheric or vacuum gas oils, or residua. Such a gas stream may contain about 90 mol % $H_2$, 3–10 mol % $H_2S$, the balance being methane.

Generally, however, the gas stream may contain hydrogen sulfide or precursors thereof in any concentration since the only effect will be the time to break through, that is, the point at which the sorbent's capacity for sorbing hydrogen sulfide per incremental volume drops off rapidly, and regeneration of the sorbent may be desirable. However, the occurrence of breakthrough does not mean that the sorbent is completely inactive to sorbing hydrogen sulfide; rather, a possibly unacceptable high quantity of hydrogen sulfide passes through the sorbent unsorbed. Thus, regenerating the sorbent just prior to breakthrough point, which can be easily predetermined, is usually a preferred method of operation. Preferably, however, the gas stream will contain no more than about 10 mol % hydrogen sulfide, more preferably no more than about 5 mol % hydrogen sulfide, and still more preferably, no more than about 3 mol % hydrogen sulfide.

An inert gas may be employed to dilute the gaseous feed stream but is normally not desirable since it will tend to overly dilute the feed stream. Such a gas may be steam, nitrogen, carbon monoxide, carbon dioxide, etc. or any like material so long as the gas does not have any oxidizing effect on the gaseous feed stream. The feed stream will preferably contain some steam, however.

In accordance with this invention, the gaseous feed stream is brought into contact with the sorbent and hydrogen sulfide and its precursors (e.g., carbonyl sulfide) is selectively sorbed, the remaining components of the gaseous feed stream passing through the sorbent substantially unaffected (carbonyl sulfide in the presence of steam will be hydrolyzed to hydrogen sulfide and sorbed and the sorbent also acts as a moderate water gas shift catalyst). The sorption process is believed to proceed via the reversible formation of a lanthanum or rare earth metal sulfide or oxysulfide, regeneration perhaps being effected through a redox reaction.

Process conditions are not normally critical, however, equilibrium favors the formation of the metal sulfide (or oxysulfide) increasingly at increasing temperatures. Consequently, the process temperature should be above about 300°F., preferably above about 500°F. and preferably ranges from about 500°–1700°F., more preferably 600°–1100°F., and still more preferably, 700°–1000°F.

Pressure is not critical and the sorption process can be operated at virtually any pressure, for example, between 0 and about 600 psig, preferably 0 to about 100 psig. Similarly, space velocity may also vary rather widely and can range from about 1 to 2000 v/v/hr., preferably 100–1500 v/v/hr., and still more preferably 300 to 1000 v/v/hr.

Sorption capacity can generally be predetermined or easily measured by the breakthrough point. In any case, flow of the gaseous feed stream is then interrupted and the desorption cycle is commenced. As previously mentioned, desorption comprises a two-stage treatment involving contact of the hydrogen sulfide loaded sorbent with steam to desorb the hydrogen sulfide in a concentrated gas stream followed by contacting the desorbed sorbent with an oxidizing atmosphere to complete the regeneration of the sorbent.

Desorption can be easily effected at temperature and pressure conditions similar to those employed for the sorption stage. In a preferred embodiment, desorption is effected at the same reaction conditions as sorption. This allows for a balanced operation with parallel reactor trains and recognizes the fact that desorption rate is mostly independent of temperature when the operation is effected at preferred conditions.

Desorption is necessarily effected by contacting the hydrogen sulfide loaded sorbent with steam or a gas containing steam. The resulting product gas stream contains hydrogen sulfide in much greater concentrations than in the feed gas stream and it can be readily separated from the steam, e.g., by condensation. The steam rate can vary widely ranging from about 0.1 to about 10 moles steam per mole sorbed hydrogen sulfide per minute, preferably from about 0.5 to about 7 moles steam per mole sorbed hydrogen sulfide per minute and, still more preferably, from about 2 to about 5 moles steam per mole sorbed hydrogen sulfide per minute. The desorption rate, however, is unaffected by increasing the steam rate above about 4 moles of steam per mole of sorbed hydrogen sulfide per minute. Taking into account total desorption rate and the amount of time required for desorption, the steam fed during desorption is about 1 to 100 moles per mole of sorbed hydrogen sulfide, preferably about 10 to 60 moles steam per mole sorbed hydrogen sulfide and, more preferably, 20 to 40 moles steam per mole sorbed hydrogen sulfide. If desired, an inert carrier gas may be employed in ranges varying from 1 to about 99 percent inert gas, for example, nitrogen, helium, argon, and the like. It has also been found that inert gases, e.g., nitrogen, may be utilized to purge a hydrated sorbent of sorbed hydrogen sulfide. Thus, a cerium-containing sorbent has been desorbed at the aforementioned process conditions using nitrogen.

Completion of the desorbing stage can easily be determined by analyzing the product gas stream for hydrogen sulfide, for example, by scrubbing the gas with a solution of cadmium acetate ($Cd(C_2H_3O_2)_2$ and simultaneously measuring the volume of the gas. Hydrogen sulfide forms a yellow precipitate in cadmium solution, and the precipitate being cadmium sulfide. The precipitate is then treated with a known excess of iodine and back titrated with thiosulfate. Thus, the quantity of sulfur present is determined and by knowing the volume of gas, the average concentration of hydrogen sulfide in the gas can be calculated.

It has been found, however, that the steam desorbed sorbent does not have sufficient activity to be economically useful in subsequent sorption cycles and that contact with an oxidizing gas, such as air or oxygen or an oxygen-containing gas is required to restore the sorption activity of the sorbent, that is, regenerate the sorbent. Contact with the oxidizing gas can also be effected at temperature and pressure conditions similar to those utilized in the sorption and desorption cycles. The period of contact should be that which is sufficient to reactivate the sorbent, usually a few minutes, and will vary as a function of temperature and gas flow rate. Reactivation is generally effected in at least about 5 minutes but the air contact period may range from about 5 minutes to one hour at space velocities ranging from about 1 to 3000 v/v/hr., preferably about 100 to 2000 v/v/hr., more preferably about 500 to 2500 v/v/hr. The determination of optimum air contact times can be easily established for any given set of conditions, that is, temperature, sorbent composition, hydrogen sulfide capacity of the sorbent.

Regeneration should result in an essentially complete restoration of sorbent capacity for sorbing hydrogen sulfide and its precursors. Depending on the efficiency of regeneration, the efficiency of removing hydrogen sulfide during sorption increases with the thoroughness of the regeneration. However, the point of breakthrough typically remains the same when the sorbent exhibits lined-out behavior. If regeneration is poor, then the efficiency of sorption drops and if regeneration is very poor or incomplete, the capacity to break through is diminished. The efficiency of sorption is the percent hydrogen sulfide removed up to breakthrough. The capacity of how much hydrogen sulfide the sorbent can sorb. Regeneration is desorption treating with an oxidizing gas. The sorbent is useful because capacity reaches an essentially constant value from cycle to cycle; that is, it has lined out.

Turning to FIG. 1 and assuming for the moment the sorption is being carried out in reactor A and desorption in reactor B, a gaseous reducing stream is fed by line 10 through line 11 and open valve 30 into reactor A which contains a lanthanum oxide on alumina sorbent and where hydrogen sulfide is selectively sorbed and the cleaned up product gas exits reactor A in 12 through open valve 34 and thence to down stream processing in line 15. At the same time as sorption is being carried out in reactor A, the sorbent in reactor B is undergoing desorption/activation. First steam with or without an inert carrier gas is fed from line 20 through open valves 25 and 32 into reactor B via line 23. The desorbed product gas stream containing steam and hydrogen sulfide exits reactor B by line 14 open valve 37 and via line 16 to hydrogen sulfide recovery. Subsequent to steam desorption, valve 25 is closed and air is fed through line 22 and open valves 26 and 32 into reactor B via line 23 to activate the sorbent. The air exits in the same manner as the desorbing steam or may exit through a separate line (not shown).

When the sorbent in reactor A has reached capacity the desorbing/activation operation in reactor B is substantially complete and the reactors are switched, that is, reactor B will go on the sorption cycle while reactor A will go on the desorption/activation cycle. Thus, valve 30 is closed and 33 opened to permit the feed gas in line 10 to enter line 13 reactor B. Treated feed gas exits line 14 and valve 37 is closed while valve 36 is opened and treated gas is collected from line 15. Similarly, the desorption/activation cycle is carried out in reactor A by sequentially opening and closing valves 25 and 26, 31 and 32 and 34 and 35 to allow feed into either reactors A or B by lines 21 and 23, respectively, and out of said reactors by lines 12 and 14 respectively.

A balanced cycle is one wherein the time spent regenerating the sorbent is equal to or less than the time spent sorbing. To illustrate this point, assume the following:

Sorbent Capacity: 220 vols. 1.05% $H_2S$ gas/vol. sorbent. Given this capacity, breakthrough will occur after 22 minutes of sorption at 600 V/V/Hr. This means that the regeneration time cannot exceed 22 minutes. Specifying an air treat of 1000 v/v/hr. for 10 minutes, there are 12 minutes in which to accomplish the desorption in order to maintain a balanced cycle. If 30 moles of steam are to be used per mole of sorbed hydrogen sulfide, then the steam feed rate is 2.5 moles of steam per mole of sorbed hydrogen sulfide. Hence,

| | |
|---|---|
| Sorption: | |
| v/v/hr. | 600 |
| Capacity to breakthrough | 220 vols./vol. |
| Time | 22 mins. |
| Desorption: | |
| Steam Quantity | 30 moles/mole sorbed $H_2S$ |
| Steam Rate | 2.5 moles/mole sorbed $H_2S$/min. |
| Time | 12 mins. |
| Air Treat | |
| v/v/hr. | 1000 |
| Time | 10 mins. |
| Sorption Time | 22 mins. |
| Regeneration Time | 22 mins. |
| (Desorption and Air Treat) | |
| Total Cycle Time | 44 mins. |

Figure 2:
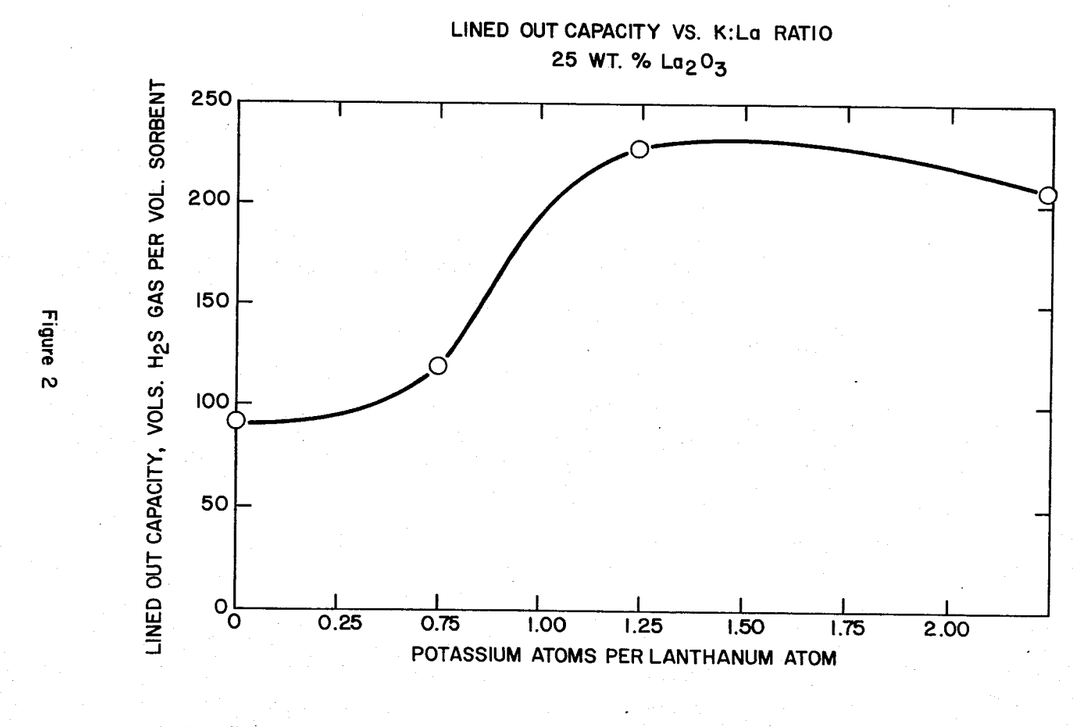
FIG. 2 shows a graphic representation of a preferred embodiment of this invention.

FIG. 2 is a plot of the lined out (steady state) capacity for a supported lanthanum oxide (25 wt. %) on alumina sorbent promoted with various amounts of potassium. The figure shows the effect of the promoter being evidenced at rather low concentration levels of promoter and reaching a maximum at about 1.30 atoms of potassium per atom of lanthanum on the support. Higher promoter concentrations do not increase the sorbent capacity and while the capacity appears to drop off somewhat, it remains significantly higher when compared to an unpromoted sorbent.

The following examples will serve to illustrate further the inventive concepts disclosed herein:

EXAMPLE 1

A sorbent was prepared by impregnating a high surface area high purity alumina (S.A. 183 $m^2$/gm. by B.E.T.) with $La(NO_3)_3.6 H_2 O$ such that the final concentration would be 25.0 weight % $La_2O_3$ and calcined at 1000°F. in air for 16 hours. The sorbent was then tested for activity in sorbing $H_2S$ from a gas stream of the following composition:

| Component | Mole % of Component |
|---|---|
| $H_2S$ | 0.96 |
| $CH_4$ | 2.75 |
| CO | 20.08 |
| $CO_2$ | 6.74 |
| $H_2$ | 9.08 |
| $N_2$ | 51.69 |
| $H_2O$ | 8.70 | at 1000 v/v/hr. space velocity, 1000°F. temperature, and 0 psig pressure. After $H_2S$ breakthrough, the sorbed $H_2S$ was desorbed with steam, and the sorbent was subsequently given an air treat. This cycle was repeated eight times. The initial capacity of the sorbent declined from 136 volumes of $H_2S$ containing gas per volume of sorbent (vols./vol.) to a lined out value of 93 vols./vol.

EXAMPLE 2

A sorbent was prepared in similar fashion to that in Example 1 using a silica-stabilized alumina (surface area 253 $m^2$/gm.) with a final lanthanum concentration of 25.0 weight % $La_2O_3$. The sorbent was tested under conditions identical to those in Example 1. The initial activity of 35 vols./vol. increased to a lined out value of 54 vols./vol. through a test period of six cycles of sorption, steam desorption, and air treat.

EXAMPLE 3

A sorbent was prepared in similar fashion to that in Example 1 using a high purity, high surface area alumina support substituting didymium nitrate for lanthanum nitrate, with a final rare earth concentration of 25.0 weight % rare earth oxide. The sorbent was tested under conditions identical to those in Example 1. The initial activity of the sorbing $H_2S$ increasd from 16 vols./vol. to a lined out value of 75 vols./vol. through a test period of nine cycles.

EXAMPLE 4

A sorbent was prepared in similar fashion to Example 3 with a final rare earth concentration of 29.4 weight % rare earth oxide. The sorbent was tested under conditions identical to those in Example 1. The initial activity of the sorbent increased from 70 vols./vol. to a lined out value of 77 vols./vol. through a test period of eight cycles.

EXAMPLE 5

A sorbent was prepared in similar fashion to Example 3 with a final rare earth concentration of 40.0 weight % rare earth oxide. The sorbent was tested under conditions identical to those in Example 1. The initial activity of the sorbent decreased from 190 vols./vol. to a lined out value of 37 vols./vol. through a test period of eight cycles.

EXAMPLE 6

A sorbent was prepared in similar fashion to Example 3 with a final rare earth concentration of 50.0 weight % rare earth oxide. The sorbent was tested under conditions identical to those in Example 1. The initial activity of the sorbent decreased from 380 vols./vol. to a lined out value of 88 vols./vol. through a test period of nine cycles.

EXAMPLE 7

A sorbent was prepared by impregnating a high surface area high purity alumina (S.A. 183 $m^2$/gm.) with $La(NO_3)_3 \cdot 6 H_2O$ such that the concentration, after calcining at 1000°F. for 16 hours, would be 7.7 weight % $La_2O_3$. After calcining, this preparation was impregnated with KOH such that ratio between K and La was 13 to 10 atoms K per atom La. This preparation was calcined a second time at 1000°F. for 16 hours and tested under conditions identical to those in Example 1. The initial activity of 172 vols./vol. declined to a lined out value of 97 vols./vol. through a test period of 14 cycles.

EXAMPLE 8

A sorbent was prepared after the fashion described in Example 7 such that the $La_2O_3$ concentration before impregnation with KOH was 20.0 weight % $La_2O_3$ and after impregnation with KOH the K:La ratio was maintained at 13:10. The preparation was tested under conditions identical to those in Example 1. The initial activity of 829 vols./vol. declined to a lined out value of 221 vols./vol. through a test period of 12 cycles.

EXAMPLE 9

A sorbent was prepared after the fashion described in Example 7 such that the $La_2O_3$ concentration before impregnation with KOH was 25.0 weight % $La_2O_3$ and after impregnation with KOH the K:La ratio was maintained at 13:10. The preparation was tested under conditions identical to those in Example 1. The initial activity of 856 vols./vol. declined to a lined out value of 229 vols./vol. through a test period of 26 cycles.

EXAMPLE 10

A sorbent was prepared after the fashion described in Example 7 such that the $La_2O_3$ concentration before impregnation with KOH was 40.0 weight % $La_2O_3$ and after impregnation with KOH the K:La ratio was maintained at 13:10. The preparation was tested under conditions identical to those in Example 1. The initial activity of 878 vols./vol. declined to a lined out value of 217 vols./vol. through a test period of 22 cycles.

EXAMPLE 11

A sorbent was prepared after the fashion described in Example 7 such that the $La_2O_3$ concentration before impregnation with KOH was 25.0 weight % $La_2O_3$ and after impregnation with KOH the K:La was 1:2 atoms K per atom(s) La. The preparation was tested under conditions identical to those in Example 1. The initial activity of 531 vols./vol. declined to a lined out value of 120 vols./vol. through a test period of nine cycles.

EXAMPLE 12

A sorbent was prepared after the fashion described in Example 11 with K:La ratio changed to 2:1 atoms K per atom(s) La, all other variables held constant. The preparation was tested under conditions identical to those in Example 1. The initial activity of 860 vols./vol. declined to a lined out value of 208 vols./vol. through a test period of eight cycles.

EXAMPLE 13

A sorbent was prepared after the fashion described in Example 9 substituting didymium nitrate for lanthanum nitrate keeping the weight % rare earth oxide and the K:La ratio equivalent to that described in Example 9. The preparation was tested under conditions identical to those in Example 1. The initial activity of 820 vols./vol. declined to a lined out value of 194 vols./vol. through a test period of 24 cycles.

EXAMPLE 14

A sorbent was prepared by impregnating a high surface area high purity alumina (S.A. 183 $m^2$/gm.) with $La(NO_3)_3 \cdot 6 H_2O$ such that the concentration of $La_2O_3$, after calcining at 1000°F. for 16 hours, was 14.3 weight % $La_2O_3$. After calcining at 1000°F., the preparation was impregnated with $Bi(NO_3)_3 \cdot 5 H_2O$ to yield a sorbent preparation with a 1:1 ratio of Bi atoms per La atom. The sorbent was tested under conditions identical to those in Example 1. The intial activity of 0 vols./vol. increased to a lined out value of 63 vols./vol. through a test period of six cycles. A similar sorbent preparation omitting the La displayed sorption activity but was not amenable to steam desorption of the sorbed $H_2S$. Similar sorbents, substituting Cu, Fe, Zn, or Ag for the Bi; and omitting the La, were likewise capable of sorbing $H_2S$ but were also not amenable to steam desorption of the sorbed $H_2S$.

EXAMPLE 15

A sorbent was prepared by impregnating a silica stabilized alumina (253 $m^2$/gm. S.A.) with $La(NO_3)_3 \cdot 6 H_2O$ and KOH after the fashion described in Example 9 and at the concentrations and ratios therein specified.

This sorbent was tested under conditions specified in Example 1 except that the feed rates of steam and the temperature of steam desorption were varied. Table I compares the effect of varying steam feed rates at 1000°F. and 0 psig, and Table II compares the effect of varying the temperature of the steam desorption at a constant steam feed rate and 0 psig.

TABLE I

Steam Feed Rate Variation at 1000°F.
(% H₂S Desorbed vs. Time and Feed Rate)

| Steam Feed Rate (moles H₂O per mole H₂S sorbed per min.) Time (Min.) | 1.388 | 0.765* | 0.671 | 0.283* |
|---|---|---|---|---|
| 10 | 73.82 | 61.53 | 60.95 | 32.68 |
| 20 | 14.99 | 20.50 | 21.50 | 28.06 |
| 30 | 1.70 | 9.91 | 7.92 | 15.89 |
| 40 | 4.72 | 1.14 | 4.75 | 7.86 |
| 50 | 2.57 | 2.32 | 2.70 | 4.77 |
| 60 | 1.32 | 2.74 | 1.46 | 2.58 |
| 70 | 0.88 | 1.42 | 0.72 | 2.75 |

*Steam desorption continued beyond 70 minutes, hence column does not sum to 100.00.

Slowing the steam rate slows the rate at which the H₂S is desorbed but not proportionally. Hence, at the lower feed rates for steam, the ratios between the moles of steam fed and the moles of H₂S desorbed are lower, indicating a greater utilization of the steam. To maximize the practicality of the process the time required for the last two stages of the cycle (steam desorption and air treat) should equal the time required for the sorption stage.

Table II

% H₂S Desorbed as a Function of Time and Temperature
(Constant steam feed rate, 0.28 moles H₂O/mole sorbed H₂S/min.)

| Time | Temp., °F. | | |
|---|---|---|---|
| | 996 | 894 | 693 |
| 10 | 39.35 | 36.52 | 32.06 |
| 20 | 24.39 | 30.13 | 44.97 |
| 30 | 13.04 | 11.17 | 6.69 |
| 40 | 7.31 | 5.89 | 4.07 |
| 50 | 4.56 | 4.16 | 3.10 |
| 60 | 3.02 | 2.64 | 2.34 |
| 70 | 2.06 | 2.53 | 1.69 |
| 80 | 1.90 | 1.82 | 1.46 |
| 90 | 1.17 | 1.46 | 1.02 |
| 100 | 1.13 | 1.26 | 0.91 |
| 110 | 0.96 | 1.22 | 0.82 |
| 120 | 1.13 | 0.62 | 0.86 |

Lowering the temperature during the steam desorption actually improves the recovery of H₂S through the first twenty minutes. With increasing time, the logarithmic nature of the desorption begins to exert a leveling effect on the H₂S desorption.

EXAMPLE 16

A sorbent similar to that in Example 15 was used to determine optimum conditions for the air treat at temperatures and pressures specified in Example 1. The time and flow rate of the air treat was varied as follows:
1. 660 v/v/hr. of air for 5 min.
2. 620 v/v/hr. of air for 10 min.
3. 1890 v/v/hr. of air for 10 min.

The sorption efficiency, i.e., the percent of the H₂S throughput sorbed, was measured on the subsequent cycle as a measure of the efficacy of the air treat at restoring the sorbent to full activity. The results are summarized in Table III.

TABLE III

| Air Treat Space Velocity, V/V/Hr. | Air Treat Efficacy as Measured by the Sorption Efficiency of the Following Cycle | | No. of Cycles Tested at Conditions |
|---|---|---|---|
| | Air Treat Duration, Min. | Average Sorption Efficiency, % | |
| 660 | 5 | 96.73 | 5 |
| 620 | 10 | 97.60 | 4 |
| 1890 | 10 | 98.39 | 3 |

Sorption efficiencies above 98 percent are judged to be a suitably efficacious restoration of sorbent capacity. In addition, during the studies at 660 v/v/hr. and 5 min. air treat duration, the efficiency of removing hydrogen sulfides from the stream to be purified experienced a cycle to cycle decline, dropping from 99.36 to 92.00 percent. For the other tests the efficiency remained constant around the average value and improved with the higher space velocity treat at a duration of 10 min.

EXAMPLE 17

A sorbent prepared after the fashion disclosed in Example 1 was tested with a 1% COS containing gas of the following composition:

| Component | Mole % |
|---|---|
| COS | 0.96 |
| CO | 20.57 |
| CO₂ | 7.38 |
| H₂ | 7.72 |
| N₂ | 54.37 |
| H₂O | 9.00 | rather than a 1% H₂S containing gas. The sorbent was tested at 50 psig, 1000°F. and sorption space velocity of 1000 v/v/hr. The following analyses of the exit gas were obtained during sorption:

| COS Remaining in Product Gas, Mole % | Volumes of Gas Over Sorbent | Total Volume of Gas Over Sorbent |
|---|---|---|
| 0.004 | 150 | 150 |
| 0.025 | 409 | 559 |

-continued

| COS Remaining in Product Gas, Mole % | Volumes of Gas Over Sorbent | Total Volume of Gas Over Sorbent |
|---|---|---|
| 0.000 | 150 | 709 |
| 0.073 | 163 | 872 |
| 0.000 | 150 | 1022 |
| 0.033 | 117 | 1139 |
| 0.002 | 150 | 1289 |

The presence of small amounts of COS in the exit gas and the fact that the gas recovered upon steam desorption was $H_2S$ is taken to indicate the sorbent is a catalyst for the hydrolysis of COS (after the equation, $COS + H_2O \rightarrow CO_2 + H_2S$), and subsequently sorbs the $H_2S$ so generated.

What is claimed is:

1. A process for reducing the sulfide concentration of a reducing gas feed mixture wherein the sulfide is hydrogen sulfide, carbonyl sulfide, or a mixture thereof, which comprises contacting the feed at a temperature above about 300°F. with a sorbent comprised of a metal-containing component, said metal being selected from the group consisting of lanthanum, rare earths, mixtures of rare earths, and mixtures of lanthanum with at least one rare earth, the sulfide concentration being reduced by sorption of the sulfide by the sorbent.

2. The process of claim 1 wherein the sorbent is supported on a porous inorganic support.

3. The process of claim 1 wherein the sorbent additionally contains a promoter selected from the group consisting of an alkali metal component, alkaline earth metal component and mixtures thereof.

4. The process of claim 1 wherein the sulfide component is desorbed from the sorbent by contacting the sulfide loaded sorbent with steam.

5. The process of claim 4 wherein the desorbed sorbent is substantially regenerated by contacting the desorbed sorbent with an oxidizing gas for a period sufficient to regenerate substantially the sorbent.

6. A process for removing sulfides selected from the group consisting of hydrogen sulfide, carbonyl sulfide, and mixtures thereof from a reducing gas feedstream which comprises contacting the feedstream, at temperatures in excess of about 500°F., with a regenerable sorbent comprised of a metal containing component, said metal being selected from the group consisting of metals having an atomic number ranging from 57 to 71 and mixtures thereof, said metal containing component being supported on a porous inorganic support, the sulfide being removed by sorption by the sorbent.

7. The process of claim 6 wherein the contacting of the feedstream and the sorbent is effected at a temperature ranging from about 500°–1700°F.

8. The process of claim 7 wherein the feedstream is derived from gasification of fluid coke.

9. The process of claim 8 wherein the feedstream contains hydrogen sulfide and carbonyl sulfide.

10. The process of claim 6 wherein the sulfide is desorbed from the sorbent by contacting the sulfide loaded sorbent with steam.

11. The process of claim 10 wherein the desorption is effected at a temperature ranging from about 500°–1700°F.

12. The process of claim 10 wherein the desorbed sorbent is substantially regenerated by contacting the desorbed sorbent with an oxidizing gas for a period sufficient to regenerate substantially the sorbent.

13. The process of claim 12 wherein the regeneration is effected at a temperature ranging from about 500°–1700°F.

14. The process of claim 12 wherein the oxidizing gas is air.

15. The process of claim 6 wherein the sorbent additionally contains a promoter selected from the group consisting of an alkali metal component, alkaline earth metal component and mixtures thereof.

16. The process of claim 15 wherein the promoter is a potassium component.

17. A cyclic process for removing hydrogen sulfide, carbonyl sulfide or mixtures thereof, from a reducing gas feedstream which comprises
   a. contacting the feedstream at a temperature of about 500° to 1700°F with a regenerable sorbent comprised of a metal containing component, said metal being selected from the group consisting of metals having an atomic number ranging from 57 to 71 and mixtures thereof and supported on a porous inorganic support;
   b. interrupting the flow of the feedstream at a predetermined time;
   c. contacting the sorbent with steam at a temperature of about 500° to 1700°F thereby desorbing hydrogen sulfide;
   d. contacting the desorbed sorbent with an oxidizing gas at a temperature of about 500° to 1700°F, for a period sufficient to regenerate substantially the sorbent; and,
   e. contacting the regenerated sorbent with the feedstream at the conditions of step (a).

18. The process of claim 17 wherein the time for steps (c) and (d) is equal to or less than the time for step (a).

19. The process of claim 17 wherein steps (a), (c) and (d) are conducted at the same temperature.

20. The process of claim 19 wherein the temperature ranges from about 600° to 1100°F.

21. The process of claim 17 wherein the sorbent is comprised of lanthanum.

22. The process of claim 17 wherein the sorbent is comprised of didymium.

23. The process of claim 17 wherein the sorbent additionally contains a promoter selected from the group consisting of a potassium component, a sodium component, and mixtures thereof.

24. The process of claim 23 wherein the promoter is potassium oxide.

25. The process of claim 24 wherein the promoter is present in an amount ranging from about 0.1 to about 10 atoms per atom of sorbent metal.

26. A cyclic process for removing sulfides selected from the group consisting of hydrogen sulfide, carbonyl sulfide or mixtures thereof from a reducing gas feedstream which comprises periodically contacting the feedstream with a sorbent at temperatures in the range of about 500°–1700°F. which sorbent is comprised of a metal component, the metal being selected from the group consisting of lanthanum, didymium, and mixtures thereof, thereby sorbing the sulfide and thereafter desorbing and regenerating the sorbent, and recovering the sulfide as hydrogen sulfide.

27. The process of claim 2 wherein the metal-containing component is comprised of lanthanum oxide.

28. The process of claim 7 wherein the metal-containing component is comprised of lanthanum oxide.

29. The process of claim 27 wherein the metal-containing component is comprised of lanthanum oxide.

30. The process of claim 29 wherein the lanthanum oxide is supported on an alumina support.

31. The process of claim 2 wherein the sorbent additionally contains a promoter selected from the group consisting of a potassium component, a sodium component, and mixtures thereof.

32. The process of claim 31 wherein the promoter is potassium oxide.

33. The process of claim 32 wherein the temperature ranges from about 600° to 1100°F.

34. The process of claim 31 wherein the sulfide is desorbed from the sorbent by contacting the sulfide loaded sorbent with steam.

35. The process of claim 34 wherein the desorbed sorbent is substantially regenerated by contacting the desorbed sorbent with an oxidizing gas for a period sufficient to regenerate substantially the sorbent.

* * * * *